FIG. 2. VII STARTING CIRCUIT

I CONTROLLED POWER CIRCUIT
II PHASE SHIFTING CIRCUIT
III AMPLIFIER CIRCUIT
IV ADJUSTABLE REFERENCE CIRCUIT FOR SPEED SETTING
V SPEED RESPONSIVE CIRCUIT
VI ACCELERATION DECELERATION RESPONSIVE CIRCUIT

Ralph L. Jaeschke, Inventor.
Haynes and Koenig
Attorneys.

Patented June 9, 1953

2,641,759

UNITED STATES PATENT OFFICE 2,641,759

CONTROL APPARATUS FOR FLUCTUATING ELECTROMECHANICAL SYSTEMS

Ralph L. Jaeschke, Kenosha, Wis., assignor to Dynamatic Corporation, Kenosha, Wis., a corporation of Delaware Application May 19, 1950, Serial No. 162,989

15 Claims. (Cl. 310—94)

This invention relates to apparatus for control of fluctuating electromechanical systems, and more particularly, to electric control apparatus for producing a control signal responsive to a fluctuating characteristic of rotary dynamoelectric apparatus and for corrective effects on such machinery.

Among the features of the invention will be noted the provision of a resistance-capacitance differentiator supplied from a D. C. source which is continuously responsive to a selected varying characteristic of the mechanical system, for example, the speed of dynamoelectric apparatus therein. The voltage appearing across the resistance of the differentiator circuit is employed to provide a control signal, the amplitude and direction of which is a function of the rate of change in the selected characteristic of the mechanical system. This feature of the invention is adapted for particularly effective minimized oscillation or hunting of the controlled apparatus.

Another feature is the provision of a thyratron grid circuit, wherein a D. C. signal input causes a phase-shift in an A. C. grid signal output. The grid circuit comprises a resistance-inductance network, the inductance of which is adjustably controlled by saturable reactor means having D. C. input winding means and the thyratrons are operated as inverters when quick release of a controlled inductive coupling is desired. The invention further includes provision for a high degree of sensitivity and convenient adjustability. Other features will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

Figure 1:
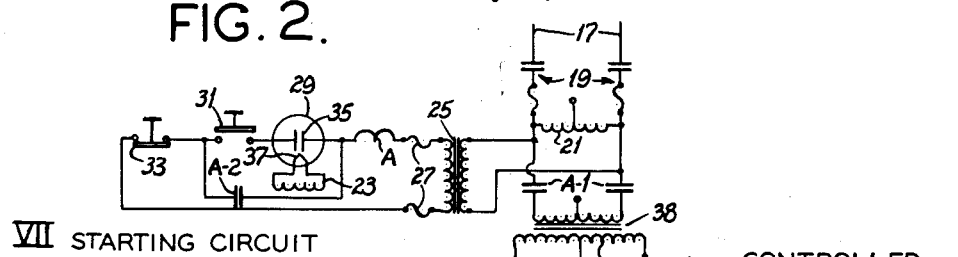
Figure 1:
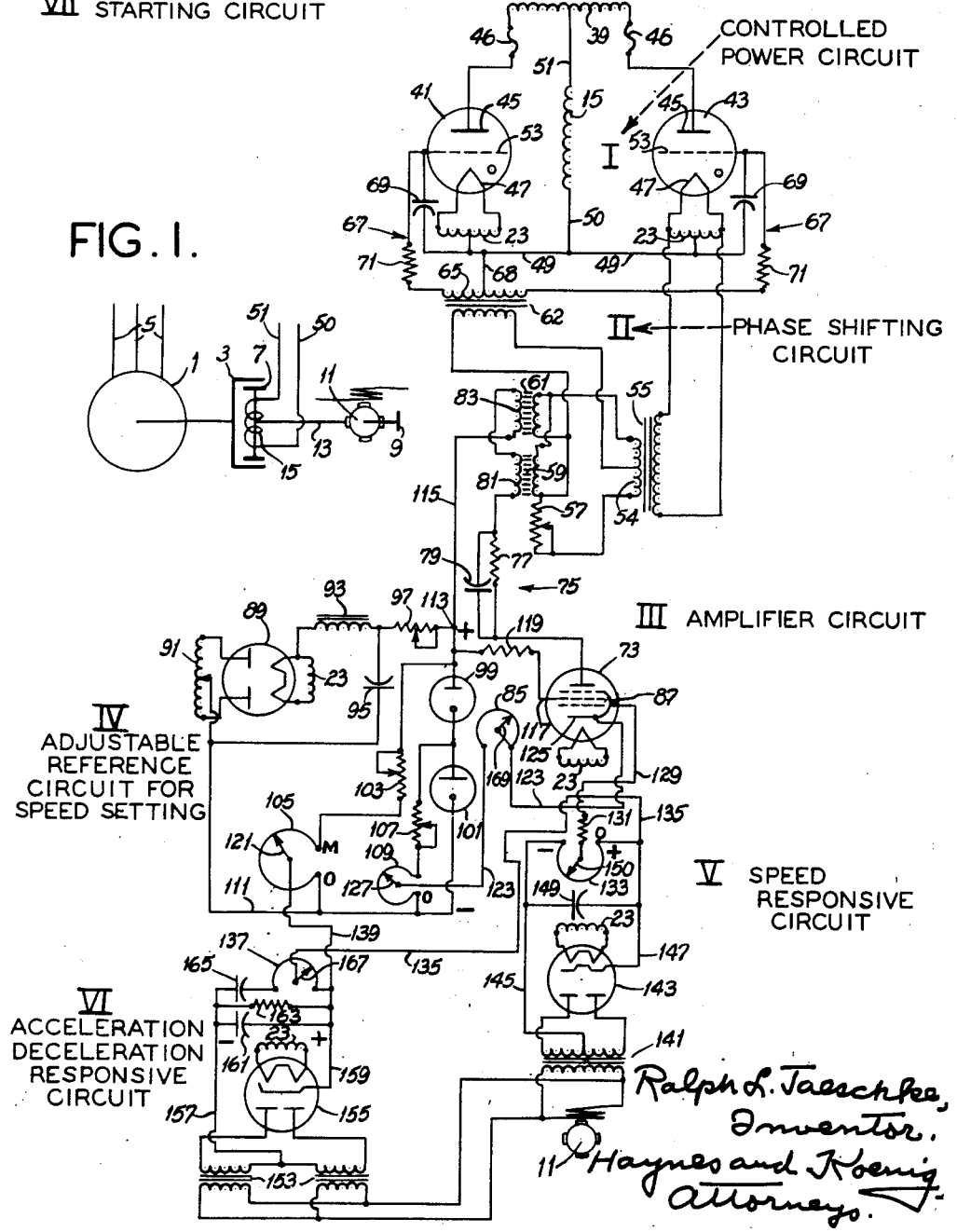

In the accompanying drawings in which one of the various possible embodiments of the invention is illustrated, Fig. 1 is a diagrammatic view of the combination of a motor and an eddy-current slip-coupling adapted to be controlled by the circuit of Fig. 2; and, Fig. 2 is a circuit diagram of a speed regulation control for an eddy-current slip-coupling incorporating the control circuit features of this invention.

Similar reference characters indicate corresponding parts throughout the several views of the drawings.

The provision of control apparatus for regulating or maintaining substantially constant a selected characteristic, such as the speed, of dynamoelectric apparatus frequently leads to oscillation or hunting problems. The controls proposed heretofore have not been entirely satisfactory in that they are not conveniently adjustable with regard to the effective mechanical and electrical parameters of the system as a whole and because they are not sufficiently sensitive. Control apparatus wherein the corrective signal is proportional merely to the deviation of a characteristic from a predetermined norm is especially likely to cause hunting, much in the same way that a spring-loaded weight tends to oscillate or "hunt" when disturbed. Hunting is largely eliminated if a corrective signal is applied immediately upon the onset of the disturbance and in proportion to the disturbing force.

In moving mechanical systems, particularly rotating machinery, it is difficult to measure disturbing forces tending to cause undesired operation. This difficulty is overcome herein by measuring acceleration or deceleration which are a function of the disturbing force when masses remain constant, as they do in the majority of rotating mechanical systems.

Referring to Fig. 1 of the drawing, there is shown a motor 1, for example, a conventional squirrel-cage induction motor energized by power supply lines 5 and connected to a driving member 3 of an eddy-current slip-coupling. The driven member 7 of the coupling is connected to a mechanical load member (not shown) by means of a flange 9 and has a control generator 11 driven by its shaft 13. A field coil 15 induces a magnetic field interlinking the driving element 3 and the driven element 7 of the coupling, the excitation of the field coil being varied to control the degree of rotary slip in the coupling from a minimum value near synchronism to some maximum value. Field coil 15 is excited by the control apparatus described below. An object is to maintain the speed of shaft 13 as near constant as possible under various transient conditions of load as determined by the excitation of coil 15.

The control apparatus of this invention is energized from an A. C. source by power lines 17 connecting through fuse disconnecting switches 19 and normally - open magnetic contactor switches A–1. A transformer 21 is connected across the power lines between the disconnecting switches 19 and the contactor switches A–1. Transformer 21 has secondary windings 23 supplying suitable filament heating and plate voltages to various tubes incorporated in the apparatus.

A tube protecting start-stop circuit is provided at VII. This circuit comprises in series a step-down transformer 25 in parallel with the transformer 21, fuses 27, the coil A for the magnetic contactor switches A–1, a time-delay contactor 29, a normally-open push-button start switch 31 and a normally-closed push-button stop switch 33. A holding switch A–2, actuated by the coil A, bypasses the time-delay contactor 29 and the start switch 31. The time-delay contactor 29 shown has a bimetallic thermostatic switch 35 breaking the start circuit and a heater 37 supplied by one of the secondaries 23 of the transformer 21. The thermostatic switch 35 and heater 37 are enclosed in a hydrogen filled envelope for improved heat conductivity to provide rapid recycle.

When the fuse disconnecting switches 19 are closed, transformer 21 through its secondary 23 warms up the tubes. Time-delay contactor 29 prevents closure of contactor switches A—1 and application of plate voltage to the power tubes before the tubes reach correct operating temperatures, the heating rate of heater 37 being so co-ordinated.

For purposes of description, the remainder of the control circuit is divided into six parts; namely, a power circuit I for exciting the slip-coupling, a phase-shifting grid circuit II, an amplifier circuit III, a speed-setting signal circuit IV, a speed-responsive correcting signal circuit V and an acceleration-responsive correcting signal circuit VI.

Power is supplied to circuit I by a transformer 38 across the power lines 17 and having a center tapped secondary 39. A pair of grid-controlled gas-filled discharge tubes or thyratrons 41 and 43 supply variable amounts of D. C. power to the field coil 15. The plates 45 of tubes 41 and 43 are connected through fuses 46 to opposite ends of the secondary 39. The tube cathodes 47 are joined by connector 49 to one terminal 50 of the field coil, the other terminal 51 being center tapped to the transformer secondary 39. Tubes 41 and 43 fire approximately on alternate half cycles of the A. C. voltage appearing across transformer 39, some overlap resulting from the smoothing inductance offered by the field coil. The time-delay start circuit VII prevents damage which would result if the plate voltage were applied to the thyratrons before their filaments were at correct operating temperature.

Tube conduction, and thereby excitation of the clutch field coil 15, is controlled by a signal applied to the grids 53 of the tubes. In this embodiment, the grid signal is a periodic voltage variably lagging in phase angle with respect to the A. C. plate voltage.

Circuit II comprises a transformer 55 connected to provide an A. C. signal in phase with the rectifier plate voltage, as by connecting across one of the secondaries 23 of transformer 21. The secondary 54 of transformer 55 is connected across a series resistance-inductance circuit constituted by an adjustable resistor 57 and by two parallel saturable-core reactors 59 and 61. A coupling transformer 62 is connected to the center tap of secondary 54 and between the resistor 57 and the paralleled saturable reactors 59 and 61.

Transformer 55 supplies a sinusoidal A. C. voltage for the impedance bridge formed by the center-tapped secondary 54, the resistor 57 and the saturable reactors 59 and 61. The output of the bridge is taken at transformer 62. The reactors 59 and 61 have input windings 81 and 83 supplied with direct current for varying the phase angle of the output relative to the sinusoidal input from transformer 55.

When the D. C. input to the saturable reactors is substantially zero the reactors offer a maximum impedance which is relatively greater than that of resistor 57, and the output of the bridge is approximately 170 degrees out of phase with the input or the plate voltage of the thyratrons. The impedance or reactance of the reactors is decreased by supplying direct current to the windings 81 and 83. When the inductors 59 and 61 are saturated by D. C. input at 81 and 83, the impedance of the inductors drops to a value relatively less than that of resistor 57. The change in impedance is rapid thereby causing the phase angle of the periodic or A. C. voltage appearing at the transformer 62 to change relative to the A. C. voltage at transformer 54 proportionate to the D. C. current in the input to the saturable reactors. The change is such as to advance the firing angle of the tubes 41 and 43 and increase tube conduction. By varying the input to the D. C. windings of the saturable inductors 59 and 61, the phase of the voltage from transformers 55 is varied through approximately 170°.

The output of the bridge at transformer 62 is fed to the grids 53 of the thyratrons 41 and 43. Grid circuits 67 are provided by a cathode conductor 68 center-tapped to the secondary 65 of transformer 62 and by grid-current limiting resistors 71 connected between the grids 53 and the opposite ends of secondary 65. Capacitors 69 are provided across the grids 53 and cathodes 47 to prevent misfiring of tubes 41 and 43 by plate voltage transients. The value of each capacitor 69 is approximately ten times the grid-to-plate capacitance of the tubes. The values of the resistors 71 and capacitors 69 is such that the R-C (resistance-capacitance) network has only a slight phase shifting effect.

Thus, the excitation of the clutch is controlled by varying the D. C. input to the saturable reactors. Circuit III, provided for this purpose, includes grid-controlled amplifier tube 73, preferably, a sharp-cutoff screen grid pentode, for example an R. C. A. 6SH7. The plate circuit of tube 73 comprises in series: an anticipator network 75, constituted by resistor 77 and a paralleled capacitor 79; the D. C. input windings 81 and 83 of the saturable reactors 59 and 61, respectively; a sensitivity control variable resistor 85; and a D. C. power supply to be described. Input windings 81 and 83 of the saturable reactors have equal transformer ratios and are series connected in opposed relation so that induced A. C. voltages are cancelled. The parallel resistance-capacitance network 75 may be considered to be an anticipator, in that it supplies an exaggerated transient effect at the input windings 81 and 83 of the saturable reactors or inductors when changes occur in the plate current of tube 73.

The amplifier tube 73 is controlled by a signal or bias applied to its control grid 87. Increasing plate current flows in the plate circuit as the grid voltage is driven in a positive direction from cutoff. For the most part, the grid-to-plate transfer characteristic of the tube is substantially linear. As the bias of tube 73 is driven in a positive direction, the tube conducts causing the saturable reactors to advance the firing angle of the tubes 41 and 43. Advance of the lagging firing angle applied to the thyratrons 41 and 43 causes increasing excitation of the field coil.

The amplifier tube 73 is under the combined effective control of three D. C. voltage sources or control circuits; namely, the reference voltage source or speed-setting control circuit IV, the speed-responsive voltage source or speed-regulation circuit V, and the acceleration-responsive voltage source or anti-hunt circuit VI.

Circuit IV is in effect a regulated power supply providing the plate, screen grid and cutoff bias voltages for tube 73 in addition to an adjustable speed-setting bias. The circuit comprises a full-wave rectifier tube 89 supplied by a center-tapped transformer winding 91. Winding 91 is one of the secondaries of the transformer 21. The rectified output is ripple filtered by an inductance-input filter consisting of a choke 93 and a shunting capacitor 95, and is regulated by means of resistor 97 and voltage regulating tubes 99 and 101. A variable resistor 103 and an adjustable voltage divider 105 are series connected across the two voltage-regulating tubes to provide an adjustable D. C. bias for speed-setting purposes.

A second series network consisting of a variable resistor 107 and an adjustable voltage divider 109 is connected across the regulating tube 101 to provide a cutoff bias. Conductor 111 extending from the cathode of regulating tube 101 to the center tap of winding 91 is of negative polarity with respect to a connection 113 to the plate of tube 99. A conductor 115 leads from the input winding of one of the saturable reactors to the positive plate connection 113. The screen grid 117 of tube 73 is connected to the positive connection 113 through a resistor 119 which provides a suitable voltage drop for the screen grid bias.

The variable resistors 103 and 107 are adjusted to take up most of the voltage drop across their respective networks, thereby providing for the introduction of adjustable relatively small voltages into the grid circuit by voltage dividers 105 and 109. The adjusting arm 121 of voltage divider 105, the speed-setting potentiometer, may be varied from a zero position (index 0), in direct connection with the wire 111, to a position M for maximum speed at the other end of the voltage divider. A lead 123 connects the cathode 125 of the amplifier tube 73 through the adjustable resistor 85 to an adjusting arm 127 of the voltage divider 109. It will be noted that as adjusting arm 127 is moved away from 0 position, the cathode 125 of tube 73 is driven positive with respect to the negative connector 111. Thus, a negative cutoff bias is applied to the control grid 87, assuming the grid is connected to connector 111 as when the speed-setting potentiometer 105 is set in the 0 position.

The grid circuit is made by a lead 129 from the grid 87, a grid-current limiting resistor 131, an adjustable voltage divider 133, a lead 135, an adjustable voltage divider 137, and a lead 139 to the adjusting arm 121 of voltage divider 105. The purpose of voltage divider 133 is to introduce into the grid bias of tube 73, a D. C. signal or voltage increment which is responsive to the speed of the driven elements 7 and 9 of the coupling. Voltage divider 137 introduces a D. C. signal or voltage increment which is responsive in amplitude and direction to the acceleration and deceleration of the driven element of the coupling.

Circuit portion V includes the A. C. generator 11 having substantially a linear speed-voltage characteristic. The output is fed to a step-up transformer 141 and is rectified by a full-wave rectifier tube 143. Conductors 145 and 147 lead to the voltage divider 133 from the transformer and the cathode of rectifier tube 143 respectively and are of relative negative and positive polarity respectively. A ripple filtering capacitor 149 is connected across the conductors in parallel with the voltage divider 133. The positive conductor 147 connects through lead 135 to the cathode of tube 73 and the relatively negative adjusting arm 150 connects through lead 129 to the control grid 87.

The voltage across the conductors 145 and 147 or across the voltage divider 133 is a function of the output or speed of the generator 11. The grid connection 129 and adjusting arm 150 are relatively negative with respect to the cathode connection 135 leading from conductor 147. Thus, the signal applied to the grid of tube 73 by circuit V drives the grid in a negative direction with increasing generator output or upon adjustment of arm 150 away from the connection of conductor 147 therewith.

Voltage divider 137 of circuit VI supplies the anti-hunt signal. Essentially, the circuit is a series resistance-capacitance differentiator, the input being a D. C. voltage or signal which is continuously responsive to the speed of the coupling. The output of generator 11 is also fed to a step-up transformer 153, rectified by a full-wave rectifier tube 155 and impressed across conductors 157 and 159, the latter being positive with respect to the former. A ripple filtering capacitor 161 and a load resistor 163 are connected in parallel across the conductors. The differentiating network consists of voltage divider 137 and a series capacitor 165 and is connected in parallel with the load resistor 163. The lead 139 to the cathode of tube 73 is connected through potentiometer 105, divider 109, adjustable resistor 85 and lead 123 to conductor 159. The lead 135 to the grid of tube 73 is connected to adjusting arm 167 of voltage divider 137.

Ideally, the ripple filter should be sensitive to the frequency range of the A. C. generator. The A. C. ripple on the voltage across load resistor 163 which results from the generator output frequency is preferably minimized. However, the ripple filter should not affect or smooth out voltage variations across resistor 163 which result from generator speed fluctuations. Suitable values for the circuit elements of circuit portion VI are: capacitor 161, .1 mfd.; resistor 163, 500,000 ohms; voltage divider 137, 500,000 ohms; and capacitor 165, .5 mfd. These values are chosen to coincide with charging and discharging time of the inductive coil 15. Thus, the differentiator has a time constant for charging of approximately 0.25 second and for discharging 0.5 second. These values provide a response which is a function primarily of generator speed fluctuations and not of imperfect filtering of the A. C. generator output.

Circuit VI introduces into the grid bias of tube 73, a signal which is proportional in amplitude and direction solely to the acceleration or deceleration of the generator 11. When the generator is operating at a substantially constant speed, the voltage output of the rectifier 155 is completely impressed across the capacitor 165 and no current flows through the voltage divider 137. Thus, the voltage divider 137 does not affect the bias of the amplifier tube 73. If the generator 11 increases speed, an increasing voltage is applied across leads 157 and 159 causing current to flow through the capacitor 165. As the charge builds up on capacitor 165, a voltage drop appears across the voltage divider 137. The effect is to drive the control grid 87 of the amplifier tube in a negative direction, since arm 167 is negative relative to the lead 139 leading to the cathode of tube 73. Therefore circuit portion VI applies a transient negative signal to the bias of the amplifier tube 73, the signal amplitude being proportional to the acceleration or rate of speed change of the generator.

If the speed of generator 11 drops from the predetermined desired constant speed, the voltage across conductors 157 and 159 decreases. The capacitor 165 then discharges through the load resistor 163 and the voltage divider 137, the direction of current flow being opposite to that for generator acceleration. There is impressed across the voltage divider 137 a signal which drives the control grid 87 of the amplifier tube in a positive direction causing increased current to flow in the plate circuit of the amplifier tube.

As pointed out previously, decreasing current to the plate circuit of tube 73 causes a reduction in the excitation of the slip coupling, whereas increasing current in the plate circuit of tube 73 results in increasing excitation of the slip coupling.

Operation is as follows: Initially no current is supplied to the field coil 15 and the slip-coupling is operating with maximum slip. The fuse disconnecting switches 19 are closed causing the filaments of the various tubes to be heated through transformer 21. Also, the correct plate and screen grid voltages are applied to the amplifier tube. After a suitable time elapses during which the tube filaments reach operating temperatures, thermostatic time delay contactor 29 closes and permits operation of the magnetic contactor by start button 31. Coil A closes the line switch A-1 and holding switch A-2.

Voltage divider 109 is then adjusted to the negative cutoff bias. Adjusting arm 121 of the speed-setting potentiometer 105 is at the 0 position. No current flows in the plate circuit of the amplifier tube 73, hence the saturable reactors 59 and 61 have a maximum impedance. The phase-shifting circuit II, including the saturable reactors and the resistance 57, provides a periodic voltage which is approximately 170° out of phase with the plate voltage applied to the gas-filled discharge tubes 41 and 43. The grid signal being approximately 170° out of phase with the plate voltage prevents tube conduction.

As the speed-setting potentiometer 105 is adjusted away from the 0 position, the grid 87 of tube 73 is driven in a positive direction and D. C. current is fed through the tube to the input windings 81 and 83 of the saturable reactors 59 and 61, respectively. The firing angle of the thyratrons 41 and 43 is advanced with a resultant flow of current through the field coil. When adjusting arm 121 is in its position M for maximum speed, the thyratrons conduct at maximum values and the coupling is fully excited with minimum slip near synchronism.

As the adjusting arm 150 of the voltage divider 133 in circuit V is brought away from its 0 position, a speed responsive correcting signal is applied to the grid of amplifier tube 73. The speed-responsive corrective signal from circuit V opposes the positive reference-voltage signal supplied by circuit IV. If potentiometer 133 is adjusted to supply a large correcting signal, the amplitude of the correcting signal may be such as to overcome the reference-voltage signal and reduce the speed of the coupling. Consequently, adjusting arm 150 is moved to the maximum position away from its zero position which will supply the desired maximum speed with adjusting arm 121 in its position M. The adjusting arm 150 is at the maximum position as specified above so as to provide a steep voltage-speed characteristic for the circuit V, and thereby, a quicker and more positive correction for speed variations. Further adjustment of the clutch speed is had by moving arm 121 of the speed-setting potentiometer between the 0 and M positions.

For example, if the motor 1 has a synchronous speed of 1800 R. P. M. and it is desired to drive the driven members at various speeds from zero to approximately 1800 R. P. M., arm 150 is gradually moved away from the 0 position to the point where speed reduction begins with arm 121 in position M. Lower speeds are then obtained by adjusting the speed-setting potentiometer 105 away from position M. On the other hand, if it is desired only to operate a clutch at speeds from 0 to 900 R. P. M., then arm 150 is moved to a point where the speed is reduced to 900 R. P. M. with arm 121 in position M. The coupling is then operating with a 50% slip. This adjustment provides better speed regulation or improved response to speed variations than would have been attained if the arm 150 had been left in a position providing a maximum speed of 1800 R. P. M.

It will be noted, that speed regulation for any setting of potentiometer 105 is provided by the circuit part V through an increase or reduction in the coupling excitation which is determined by the displacement from the desired speed. The speed responsive circuit part V produces a correcting signal, the strength of which is proportional to displacement from the desired speed. That is, the greater the displacement, the greater the correcting signal. Such a condition tends to cause oscillation or hunting. The frequency and amplitude of oscillation will of course depend upon the inertia of the mechanical system, including the motor, the clutch, and the driven machine (not shown), and also upon the characteristics of the electronic control system.

Oscillation is minimized by the provision of the anticipator network 75 and by the circuit designated VI. The anticipator network provides an immediate transient over-correction whenever a change occurs as upon increase or decrease in the speed of the generator 11. Upon increase, capacitor 79 temporarily bypasses the increased segment of current, thereby causing a transient surge of current to the input windings of the saturable reactors. Conversely, when the generator speed decreases, capacitor 79 discharges through resistor 77 and causes a temporary reduction in the saturable reactor input which is greater than that attained without capacitance 79. The amplitude of the transient increment caused by the anticipatory network 75 depends upon the adjustment of the sensitivity control variable resistor 85. If all of the resistance afforded by control 85 is cut out by adjustment of its adjusting arm 169, substantially the full increment of increase or decrease in load voltage is temporarily impressed across the input windings of the saturable reactors.

For example, with no resistance at 85, a 10 volt increase in the load voltage (plate supply less tube drop) would result in a 10 volt transient signal being applied to the input windings of the saturable reactors. As the capacitor charge built up, the resistor 77 would then assume a portion of the voltage increase. The 10 volt transient signal is reduced by adjustment of the sensitivity potentiometer so as to add resistance to the plate circuit.

The anticipatory circuit 75 is helpful for many purposes, but is not conveniently adjustable where the control circuit must be adaptable to different mechanical systems since adjustment of resistance 85 has an adverse effect on the duration of the anticipatory corrective pulse. If the resistance 85 is reduced so as to increase strength of correcting signal, the duration of the correcting signal is reduced. While this effect could be counteracted to some extent by varying the capacitance 79 it is not always practicable to do so.

This result is largely eliminated by the circuit part VI. Voltage divider 137 supplies a correcting signal which is of substantial duration, the time constant being in the order of one-fourth to one-half a second. Moreover, the pulse duration is not disturbed upon adjustment of the potentiometer 137 to provide a different strength for the correcting signal. Finally, the strength and direction of the signal are directly related to the acceleration and deceleration of the mechanical system.

The correcting signal of circuit part VI is ideally adapted to minimize hunting or oscillation. In a mechanical system hunting about a predetermined norm (herein the desired constant driven speed) maximum hunting speed occurs in the middle of the swing or at the desired norm, and minimum hunting speed occurs at the extremities of the swing. Correcting circuit VI supplies its maximum correcting effect at the middle of the swing thus tending to hold the system at the desired norm, and applies a minimum correcting signal at the extremity of the swing, thus avoiding aggravation of the hunting condition.

The relatively large inductance inherent in the field coil of the coupling acts to prevent rapid changes in the degree of coupling. This feature is particularly objectionable where it is necessary to decouple the motor and load quickly. The maximum rate of decoupling is limited by the time constant (L/R) of the field coil circuit. For example, when power is removed from transformer 38 upon opening of contactor switches A-1, an inverse voltage from the field coil sustains conduction in whichever tube is conducting. The thyratrons have low impedance, hence there is a large time constant and relatively slow release of the coupling.

The time constant or rate of decoupling is reduced herein by inverting the inverse energy which remains in the field coil when its excitation is quickly reduced to zero. That is, the D. C. energy of the field coil is changed to A. C. energy by operating the thyratrons as inverters.

When a system passes from rectifier to inverter action, the D. C. power must reverse. The current flow cannot reverse since its direction through the rectifiers is fixed by the valve action. The desired effect is obtained from the inverse energy or voltage reversal of the coupling field. The plate voltage of the conducting tube, for example tube 41, is quenched or reduced below that necessary for ionization by firing the other tube 43. Upon conduction of tube 43, the self and mutual inductances of the transformer 38 momentarily induce a counter-E. M. F. which drives the plate voltage of tube 41 down to permit its grid to reassume control. The A. C. grid signal applied to the tubes results in several cycles of A. C. power before the field coil 15 completely discharges.

Fast decoupling is also had when the speed-setting potentiometer 105 is quickly adjusted to its 0 position. In this event, the D. C. current to the saturable reactors is cut off, the grid signal for the thyratrons is retarded to be 170° out of phase with the plate voltage and rectification ceases. Since inductive energy remains in the field coil 15, the polarity of the coil reverses to permit inversion. The 170° out-of-phase grid signal fires the tubes at the end of the positive cycle in the plate voltage, which is the ideal condition for inversion. While thyratron inverter circuits frequently include a capacitor connected between the thyratron anodes, such a capacitor can be dispensed with when the A. C. system is operated with a sufficiently leading current.

It will be understood that while the slip coupling is shown as a slip clutch, the control system may be readily adapted to dynamometer and brake controls which are in effect forms of clutches.

The circuit shown in the drawings includes various refinements for most convenient operation, but it will be understood that certain basic features of the invention may be carried out without all of these, although their incorporation is desirable, and in many respects new. A basic feature is to provide a control signal which is responsive to the voltage from an electric generator or the like, driven by a device to be controlled, this voltage being sent through two parallel voltage control networks or circuits. A first one of these control networks (V) provides a control signal in response to speed only of said generator, and the second one of these networks (VI) provides a control signal in response to acceleration or deceleration only of the generator. The networks are so connected that upon acceleration of the generator, the signal component from the second (VI) transiently and in proportion to the acceleration aids or provide an increment to the signal component from the first (V); and upon deceleration of the generator, the signal component from the second (VI) transiently and in proportion to the deceleration opposes and provides a decrement to the signal component from the first (V).

Thus the second network has the effect of adding a corrective component to the control signal which is effective in proportion to acceleration or deceleration, that is to say, in proportion to the rate of change of deviation from the constant speed of the generator or the like. This means that the corrective signal is immediately and proportionally responsive to the rate at which the system deviates from normal. Hence, unlike in other speed-responsive control systems, the present system prevents deviations from building up as substantial corrective operations set in. Moreover, the corrective operations themselves are not permitted to build up to over-correcting values, as is the case in many prior systems.

It may be observed that the component of the corrective signal which is in response to acceleration is achieved in a uniquely simple manner, namely, by feeding the output of the network which responds to acceleration in series through a capacitor and a resistor such as 165 and 137. Advantage is taken of the fact that current will flow through such a series connection only while the capacitor is charging, that is, when the current is changing.

The component of the corrective signal that is in response to deceleration is achieved also in a uniquely simple manner, namely, by connecting a resistance 163 in parallel with the stated series resistance-capacitance combination. The action in this connection is that when deceleration sets in, capacitor 165 may discharge through the by-passing resistance 163.

It is to be observed that the voltage output from the first circuit (V) depends upon the resistance 133, and that this is series-connected with the resistance 137 in the second circuit (VI). These constitute a portion of the control circuit of which the amplifier circuit III is a part, as well as phase-shifting circuit II and controlled power circuit I.

In the foregoing description a constant voltage reference network has in effect been referred to as providing a bucking offset to the speed-responsive voltage from the speed-responsive voltage component (see circuit IV, including resistor 105). This is necessary in control of certain dynamoelectric machinery such as the clutch shown in Fig. 1. However, in some classes of dynamoelectric apparatus such an offsetting circuit would not be required, as for example, in the case of a brake or a dynamometer. In such applications resistor 105 would be connected directly in series with the resistors 133 and 137.

In view of the above, it will be seen that the several objects of the invention are achieved and other advantageous results attained.

As many changes could be made in the above constructions and method without departing from the scope of the invention, it is intended that all matter contained in the above description or shown in the accompanying drawings shall be interpreted as illustrative and not in a limiting sense.

I claim:

1. Electrical apparatus adapted to provide a corrective signal in an excitation control circuit for dynamoelectric machinery comprising rotary means driven by the machinery to be controlled by said circuit, said rotary means being adapted to provide a speed-responsive voltage, a first control network and a second control network responsive to said voltage, means in the first network comprising a first resistance adapted to produce a speed-responsive voltage component of said signal, means in the second network comprising a second resistance and a capacitor connected in series therewith adapted to produce a transient voltage component of said signal in response to change in voltage from the rotary means, the resistances in said first and second networks being connected in series in said control circuit.

2. Electrical apparatus adapted to provide a corrective signal in an excitation control circuit for dynamoelectric machinery comprising rotary means driven by the machinery to be controlled by said circuit, said rotary means being adapted to provide a speed-responsive voltage, a first control network and a second control network responsive to said voltage, means in the first network comprising a first resistance adapted to produce a speed-responsive voltage increment of said signal, means in the second network comprising a second resistance and a capacitor connected in series therewith adapted to produce a transient voltage increment of said signal in response to increase in voltage from the rotary means, and a third resistance connected across said series-connected second resistance and capacitor adapted to produce at said second resistance a transient voltage decrement of said signal in response to decrease in voltage from the rotary means, said first and second resistances in said first and second networks respectively being connected in series in said control circuit.

3. Electrical apparatus adapted to provide a corrective signal in an excitation control circuit for dynamoelectric machinery comprising rotary means driven by the machinery to be controlled by said circuit, said rotary means being adapted to provide a speed-responsive voltage, a first control network and a second control network responsive to said voltage, means in the first network comprising a first resistance adapted to produce a speed-responsive voltage increment in said signal, means in the second network comprising a second resistance and a capacitor connected in series therewith adapted to produce a transient voltage increment of said signal in response to increase in voltage from the rotary means, and a third resistance connected across said series-connected second resistance and capacitor adapted to produce at said second resistance a transient voltage decrement of said signal in response to decrease in voltage from the rotary means, and a third control network responsive to a relatively fixed voltage having a fourth resistance adapted to provide a fixed voltage component in opposition to the said increment of speed-responsive voltage, said first, second and third resistances in said first, second and third networks respectively being connected in series in said control circuit.

4. Electronic control apparatus for speed regulation of dynamoelectric apparatus comprising a grid-controlled gaseous-discharge tube for controlling energization of the dynamoelectric apparatus, a grid circuit supplying a control signal to the control grid of said gaseous-discharge tube, said grid circuit including a circuit part providing a substantially constant D. C. voltage, a circuit part providing a D. C. voltage which is continuously responsive to the speed of the dynamoelectric apparatus and a circuit part providing a D. C. voltage which is responsive in amplitude and direction solely to the acceleration and deceleration of the dynamoelectric apparatus.

5. Electronic control apparatus for speed regulation of dynamoelectric apparatus comprising a grid-controlled gaseous-discharge tube for controlling energization of the dynamoelectric apparatus, a phase-shifting grid circuit applying a periodic voltage to the control grid of said gaseous-discharge tube, means in said phase-shifting grid circuit responsive to a control signal for varying the phase of the periodic voltage applied to the control grid of said gaseous-discharge tube, and a circuit providing said control signal, said control signal circuit including a circuit part providing a substantially constant D. C. voltage, a circuit part providing a D. C. voltage which is continuously responsive to the speed of the dynamoelectric apparatus and a circuit part providing a D. C. voltage which is responsive in amplitude and direction solely to the acceleration and deceleration of the dynamoelectric apparatus.

6. Electronic control apparatus as set forth in claim 5, wherein each of the said circuit parts has a voltage divider for variably adjusting the strength of the respective D. C. voltages provided by each circuit part.

7. Electronic control apparatus as set forth in claim 5 wherein the said means in the phase-shifting grid circuit for varying the phase of the periodic voltage applied to the control grid of the gaseous-discharge tube is a saturable reactor having a D. C. input winding.

8. Electronic control apparatus as set forth in claim 5 wherein the said phase-shifting grid circuit comprises a transformer coupled to the plate supply of said gaseous-discharge tube, a resistor and a saturable reactor.

9. Electronic control apparatus for speed regulation of dynamoelectric apparatus comprising a grid controlled gaseous-discharge tube for supplying controlling energization of the dynamoelectric apparatus, a phase-shifting grid circuit applying a periodic voltage to the control grid of said gaseous-discharge tube, means in said phase-shifting grid circuit responsive to a control signal for varying the phase of the periodic voltage applied to the control grid of said gaseous-discharge tube, a grid-controlled amplifier tube the plate circuit of which supplies said control signal, said plate circuit including an anticipator network constituted by a resistor and capacitor in parallel, an adjustable resistor in the plate circuit for varying the response of the control signal to changes in the conduction of said amplifier tube, and a second grid circuit for controlling said amplifier tube for varying the conduction of said amplifier tube, said second grid circuit including a circuit part providing a substantially constant D. C. voltage, a circuit part providing a D. C. voltage which is continuously responsive to the speed of the dynamoelectric apparatus and a circuit part providing a D. C. voltage which is responsive in amplitude and direction solely to the acceleration and deceleration of the dynamoelectric apparatus.

10. Electronic control apparatus for speed regulation of dynamoelectric apparatus comprising a grid controlled gaseous-discharge tube for supplying controlling energization of the dynamoelectric apparatus, a phase-shifting grid circuit applying a periodic voltage to the control grid of said gaseous-discharge tube, means in said phase-shifting grid circuit responsive to a control signal for varying the phase of the periodic voltage applied to the control grid of said gaseous-discharge tube, a grid-controlled amplifier tube the plate circuit of which supplies said control signal, said plate circuit including an anticipator network constituted by a resistor and capacitor in parallel, an adjustable resistor in the plate circuit for varying the response of the control signal to changes in the conduction of said amplifier tube, and a second grid circuit for said amplifier tube for varying the conduction of said amplifier tube, said second grid circuit including a circuit part providing an adjustable substantially constant D. C. voltage, a circuit part including a generator providing an adjustable D. C. voltage which is continuously responsive to the speed of the dynamoelectric apparatus and a circuit part including a generator and a resistance-capacitance differentiating network providing an adjustable D. C. voltage which is responsive in amplitude and direction solely to the acceleration and deceleration of the dynamoelectric apparatus.

11. In control apparatus for dynamoelectric apparatus having an inductive field coil, a grid-controlled gaseous-discharge tube for variably exciting said field coil and a phase-shifting grid circuit for said gaseous-discharge tube comprising a voltage divider coupled to the plate supply for said gaseous-discharge tube, a resistor and a saturable core inductor connected in series across said voltage divider, said saturable reactor having a D. C. input winding, and output connections for the grid circuit one of which is center-tapped to the voltage divider and the other of which is connected between the resistor and saturable reactor.

12. In control apparatus for dynamoelectric apparatus having an inductive field coil, a grid-controlled gaseous-discharge tube for variably exciting said field coil and a phase-shifting grid circuit for said gaseous-discharge tube comprising a transformer coupled to the plate supply for said gaseous-discharge tube, a resistor and a saturable core inductor connected in series across said transformer, and output connections for the grid circuit one of which is center-tapped to the transformer secondary and the other of which is connected between the resistor and saturable reactor.

13. Speed regulating apparatus for machinery having a member driven at a speed tending to vary, the speed regulating apparatus comprising an electrically operated control for varying the torque delivered to the driven member, a voltage source producing a D. C. voltage output continuously responsive in amplitude solely to the speed of the driven member, a differentiating network having a resistance and capacitance in series across which is impressed the D. C. output of the voltage source, substantially all current flow through the resistance of the differentiating network being also through the capacitance, a second capacitor connected across the differentiating network, this capacitor being larger than that in the differentiating network, and an amplifier for amplifying the voltage appearing across the resistance of the differentiating network, the output of the amplifier being fed to the electrically operated control for controlling said torque delivered to the driven member.

14. Speed regulating apparatus for machinery having a member driven at a speed tending to vary, the speed regulating apparatus comprising an electrically operated control for varying the torque delivered to the driven member, a voltage source producing a D. C. voltage output continuously responsive in amplitude solely to the speed of the driven member, a differentiating network having a resistance and capacitance in series across which is impressed the D. C. output of the voltage source, substantially all current flow through the resistance of the differentiating network being also through the capacitance, a second resistor and a second capacitor connected in parallel across the differentiating network, said second capacitor being several times larger than the capacitor in the differentiating network, and an amplifier for amplifying the voltage appearing across the resistance of the differentiating network, the output of the amplifier being fed to the electrically operated control for controlling said torque delivered to the driven member.

15. Speed regulating apparatus for machinery having a member driven at a speed tending to vary, the speed regulating apparatus comprising an electrically operated control for varying the torque delivered to the driven member, a voltage source producing a D. C. voltage output continuously responsive in amplitude solely to the speed of the driven member, a differentiating network having a resistance and capacitance in series across which is impressed the D. C. output of the voltage source, substantially all current flow through the resistance of the differentiating network being also through the capacitance, a second capacitor connected across the differentiating network, the value of the second capacitor being approximately 0.5 mfd., and an amplifier for amplifying the voltage appearing across the resistance of the differentiating network, the output of the amplifier being fed to the electrically operated control for controlling said torque delivered to the driven member.

RALPH L. JAESCHKE.

References Cited in the file of this patent

UNITED STATES PATENTS

| Number | Name | Date |
| --- | --- | --- |
| 2,353,107 | Winther | July 4, 1944 |
| 2,449,779 | Jaeschke | Sept. 21, 1948 |
| 2,452,609 | Somers | Nov. 2, 1948 |
| 2,462,751 | Koehler | Feb. 22, 1949 |
| 2,530,387 | Goertz | Nov. 21, 1950 |
| 2,548,278 | Wirkler | Apr. 10, 1951 |